United States Patent
Hoshiba et al.

(10) Patent No.: US 12,214,627 B2
(45) Date of Patent: Feb. 4, 2025

(54) PNEUMATIC TIRE

(71) Applicant: The Yokohama Rubber Co., LTD., Tokyo (JP)

(72) Inventors: Takashi Hoshiba, Kanagawa (JP); Tatsuro Shinzawa, Kanagawa (JP); Atsuhito Nakano, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 361 days.

(21) Appl. No.: 17/276,395

(22) PCT Filed: Sep. 11, 2019

(86) PCT No.: PCT/JP2019/035669
§ 371 (c)(1),
(2) Date: Mar. 15, 2021

(87) PCT Pub. No.: WO2020/059589
PCT Pub. Date: Mar. 26, 2020

(65) Prior Publication Data
US 2022/0032692 A1 Feb. 3, 2022

(30) Foreign Application Priority Data
Sep. 20, 2018 (JP) .................................. 2018-175729

(51) Int. Cl.
*B60C 13/00* (2006.01)
*B60C 1/00* (2006.01)

(52) U.S. Cl.
CPC .......... *B60C 13/001* (2013.01); *B60C 1/0025* (2013.01)

(58) Field of Classification Search
CPC ....... B60C 13/00; B60C 13/001; B60C 13/02; B60C 2013/006
See application file for complete search history.

(56) References Cited

U.S. PATENT DOCUMENTS

2002/0139461 A1* 10/2002 Pyle ...................... B60C 1/0016
152/209.1
2006/0151451 A1 7/2006 Smith Jr. et al.
(Continued)

FOREIGN PATENT DOCUMENTS

DE 10 2009 044 718 A1 6/2011
DE 20 2015 009 105 U1 12/2016
(Continued)

OTHER PUBLICATIONS

"Starting Point Rubber Compounding Formulations." Datasheet [online]. Nocil Limited. [retrieved on Apr. 22, 2023]. Retrieved from the Internet: <URL: https://web.archive.org/web/20160615162749/ https://www.nocil.com/Downloadfile/CCompoundingFormulations &UsefulInfo-Dec2010.pdf>. (Year: 2016).*
(Continued)

*Primary Examiner* — Robert C Dye
(74) *Attorney, Agent, or Firm* — Thorpe North & Western

(57) ABSTRACT

A pneumatic tire includes, on a surface of a side rubber provided on sidewall portions, a two-dimensional code in which a dot pattern is formed by two types of gray scale elements distinguishable from each other by irregularities on the surface. Dot holes are formed in the two-dimensional code, corresponding to dark elements of the gray scale elements. The side rubber is a diene rubber including butadiene rubber, and when A is a blended amount of the butadiene rubber relative to 100 parts by mass of the diene rubber contained in the side rubber and when B is a blended amount of carbon, a ratio A/B and a hole depth D (mm) from an opening of the dot hole to a hole bottom satisfies a relationship of $1.1 \leq (A/B)/D \leq 6.0$.

7 Claims, 3 Drawing Sheets

(56) References Cited

U.S. PATENT DOCUMENTS

| | | | | |
|---|---|---|---|---|
| 2009/0218019 A1* | 9/2009 | Paturle | ................. | B29C 33/424 |
| | | | | 428/88 |
| 2017/0050473 A1* | 2/2017 | Muhlhoff | ............. | B60C 13/001 |
| 2021/0268843 A1 | 9/2021 | Shinzawa | | |

FOREIGN PATENT DOCUMENTS

| | | | |
|---|---|---|---|
| DE | 11 2019 003 062 T5 | | 3/2021 |
| JP | 08003370 A | * | 1/1996 |
| JP | 2017-516698 A | | 6/2017 |
| WO | 2005/000714 A1 | | 1/2005 |

OTHER PUBLICATIONS

Standard Classification System for Carbon Blacks Used in Rubber Products. ASTM. (Year: 1999).*
English machine translation of JP-08003370-A. (Year: 1996).*

* cited by examiner

PNEUMATIC TIRE

TECHNICAL FIELD

The present technology relates to a pneumatic tire and particularly relates to a pneumatic tire including a two-dimensional code engraved on a sidewall portion of the tire.

BACKGROUND ART

In recent years, a proposal has been made to provide a two-dimensional code, in which information is recorded, on a sidewall portion of a pneumatic tire (hereinafter also simply referred to as tire). The two-dimensional code can include more information than a one-dimensional code. Thus, various information can be included in the two-dimensional code for management of the tire. A technique of engraving a sidewall portion with a predetermined pattern by dot holes in to form a two-dimensional code composed of a pattern of gray scale elements in the sidewall portion has been proposed (International Patent Publication No. WO 2005/000714).

The two-dimensional code formed by engraving the sidewall portion with the predetermined pattern by dot holes is prevented from disappearing unless the sidewall portion is worn away, allowing the tire to be effectively managed.

In a pneumatic tire provided with such a plurality of dot holes for a two-dimensional code, although the two-dimensional code can be read when the tire is brand-new, the readability of the two-dimensional code may decrease when the tire rolls subject to a load in an outdoor environment. "Read a two-dimensional code" refers to reading a two-dimensional code using a two-dimensional code reader, for example, a mobile terminal. "Harder to read" refers to when reading the two-dimensional code often fails. The two-dimensional code provided on the pneumatic tire is utilized by reading the information recorded in the two-dimensional code while the pneumatic tire is in use. Thus, in a case where the tire is used for a long term, cracks may occur and develop in the dot holes of the two-dimensional code to form irregularities on the surface of the two-dimensional code. Then, undesirably, distinction of the gray scale elements becomes difficult, making the two-dimensional code harder to read. Thus, the two-dimensional code is preferably inhibited from becoming harder to read when the tire is used for a long term.

Additionally, each of the dot holes has a shape recessed from the surface of the sidewall portion. This shape is not preferable in terms of durability of the side rubber and hence durability of the pneumatic tire because, during the use of the tire, cracks occur in the dot holes and develop in the thickness direction of the side rubber and further along the surface of the sidewall portion.

SUMMARY

The present technology provides a pneumatic tire engraved with a two-dimensional code and that can inhibit a two-dimensional code from being harder to read even when the pneumatic tire is used for a long term.

One aspect of the present technology is a pneumatic tire. The pneumatic tire includes: a side rubber provided on each of sidewall portions of the pneumatic tire and covering a carcass ply of the pneumatic tire from an outer side of the tire; and a two-dimensional code provided on a surface of the side rubber, the two-dimensional code having a configuration in which a dot pattern is formed by two types of gray scale elements including a light element and a dark element distinguishable from each other by irregularities on the surface and in which a dot hole is engraved using light, corresponding to the dark element of the gray scale elements.

The side rubber is a diene rubber including butadiene rubber, and when A is a blended amount of the butadiene rubber relative to 100 parts by mass of the diene rubber contained in the side rubber and when B is a blended amount of carbon, a ratio A/B and a hole depth D (mm) from an opening of the dot hole to a hole bottom satisfies a relationship of $1.1 \leq (A/B)/D \leq 6.0$.

Preferably, a hole wall surface of the dot hole is provided such that a hole cross-section decreases as approaching from the opening to the hole bottom, and a hole wall angle at a cut section of the dot hole obtained by cutting the dot hole by a plane including a hole center axis in a depth direction of the dot hole is from 10 to 50 degrees, with respect to the depth direction of the dot hole.

Preferably, when $S_{70}$ is an area of a hole cross-section of the dot hole at a position separated by 70% of the hole depth D from the opening in the depth direction of the dot hole and when $S_0$ is an area of the hole cross-section at the opening, a ratio $S_{70}/S_0$ is from 0.2 to 0.5.

Preferably, a thickness of the side rubber on a first side in a tire radial direction is greater than that on a second side, the second side being a side opposite to the first side, in a range in which the two-dimensional codes are provided, and the cut section is a cut section along the tire radial direction, and of the hole wall angles of the dot hole at the cut section, a hole wall angle $\theta 1$ on the first side in the tire radial direction is smaller than a hole wall angle $\theta 2$ on the second side in the tire radial direction.

Preferably, the cut section is a cut section along a tire circumferential direction, and of the hole wall angles of the dot hole at the cut section. An absolute value of a difference between a hole wall angle $\theta 3$ on one side in the tire circumferential direction and a hole wall angle $\theta 4$ on an other side is smaller than an absolute value of an angular difference between the hole wall angle $\theta 1$ and the hole wall angle $\theta 2$.

Preferably, a 300% tensile modulus of the side rubber is from 5.0 to 10.0 MPa.

Preferably, a nitrogen specific surface area of the carbon is from 30 to 90 ($m^2/g$).

According to the pneumatic tire described above, it is possible to inhibit the readability of a two-dimensional code from decreasing even when the pneumatic tire is used for a long term.

DETAILED DESCRIPTION

A pneumatic tire according to one embodiment will be described in detail below.

In the present specification, "tire width direction" is a direction parallel with the rotation axis of the pneumatic tire.

"Outer side in the tire width direction" is a side in the tire width direction away from a tire equator line CL (see FIG. 1) that represents the tire equatorial plane. "Inner side in the tire width direction" is a side in the tire width direction closer to the tire equator line CL. "Tire circumferential direction" is a direction of rotation with the rotation axis of the pneumatic tire as the center of rotation. "Tire radial direction" is a direction orthogonal to the rotation axis of the pneumatic tire. "Outer side in the tire radial direction" refers to a side away from the rotation axis. Similarly, "inner side in the tire radial direction" refers to a side closer to the rotation axis.

In the present specification, a two-dimensional code refers to a matrix display type code containing information in two directions, as opposed to a one-dimensional code (barcode) that contains information only in the lateral direction. Examples of the two-dimensional code include a QR Code® (trade name), a data matrix (trade name), Maxicode, PDF-417 (trade name), 16K code (trade name), 49 code (trade name), an Aztec code (trade name), an SP code (trade name), a Vericode (trade name), and a CP code (trade name).

Pneumatic Tire

Figure 1:
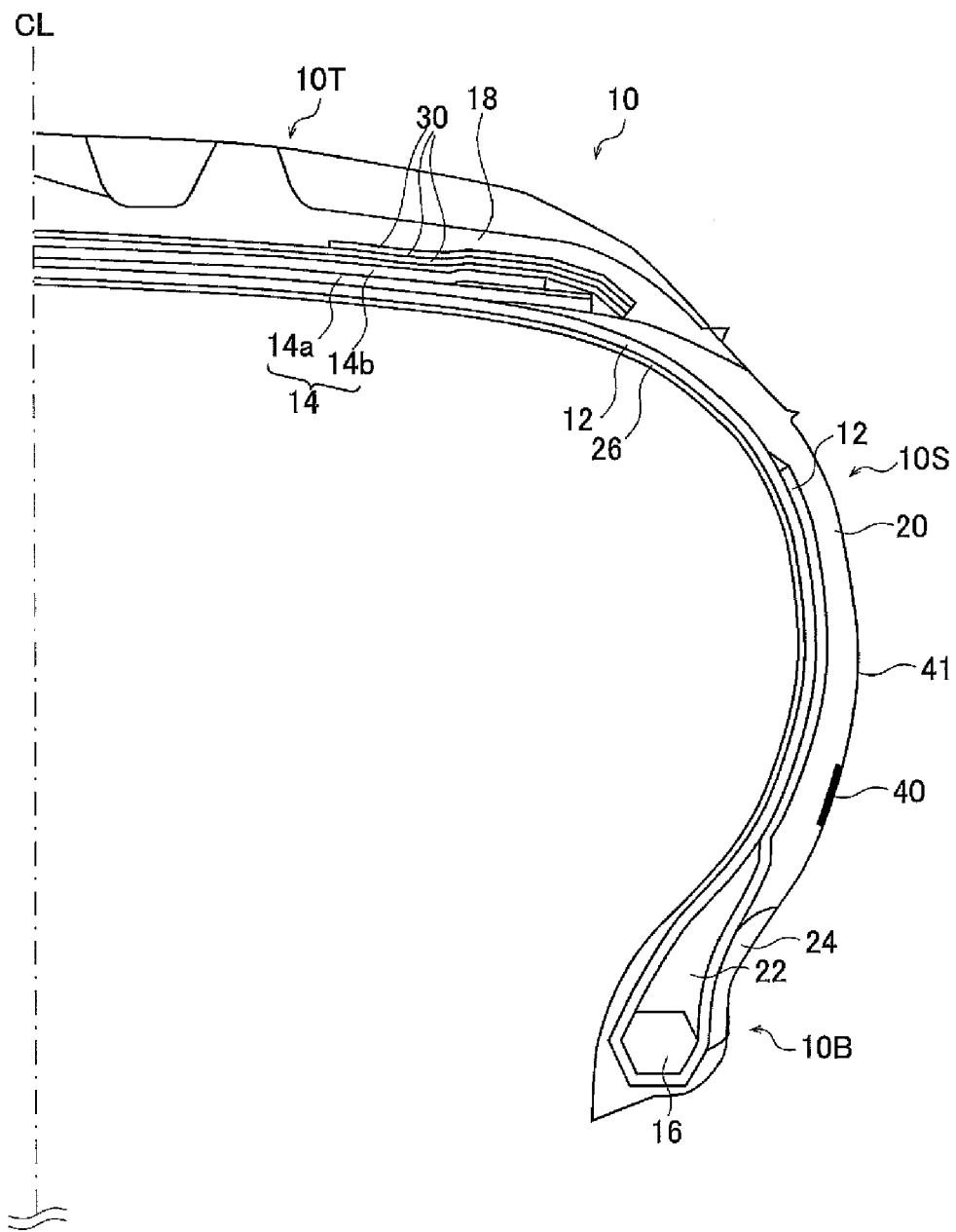
FIG. 1 is a diagram illustrating an example of a configuration of a pneumatic tire of an embodiment.

FIG. 1 is a diagram illustrating an exemplary configuration of a pneumatic tire 10 (hereinafter simply referred to as "tire 10") according to one embodiment. FIG. 1 illustrates a profile cross section of one side in the tire width direction with respect to the tire equator line CL.

The tire 10 includes a tread portion 10T including a tread pattern, a pair of bead portions 10B on the respective sides in the tire width direction, and a pair of sidewall portions 10S provided on the respective sides of the tread portion 10T and connected to the pair of bead portions 10B and the tread portion 10T. The tread portion 10T comes into contact with a road surface. The sidewall portions 10S sandwich the tread portion 10T from both sides in the tire width direction. The bead portion 10B is a portion which is connected to the sidewall portion 10S and is located on the inner side of the sidewall portion 10S in the tire radial direction.

The tire 10 primarily includes a carcass ply 12, a belt 14 and bead cores 16 as framework members, and a tread rubber 18, side rubbers 20, bead filler rubbers 22, rim cushion rubbers 24, and an innerliner rubber 26 disposed around the framework members.

The carcass ply 12 is formed of a carcass ply member that is made of organic fibers covered with rubber and wound between a pair of the annular bead cores 16 into a toroidal shape. The carcass ply 12 is wound around the bead cores 16 and extends to an outer side in the tire radial direction. The belt 14 is made up of two belt members 14a and 14b and provided on the outer side of the carcass ply 12 in the tire radial direction. The belt 14 includes a belt member of rubber-covered steel cords arranged at a predetermined angle of, for example, from 20 to 30 degrees of inclination with respect to the tire circumferential direction. The width in the tire width direction of the lower layer belt member 14a is larger than the width in the tire width direction of the upper layer belt member 14b. The steel cords of the belt members 14a and 14b extend with inclination in opposite directions with respect to the tire circumferential direction. As such, the belt members 14a and 14b are crossing layers serving to suppress expansion of the carcass ply 12 due to the pressure of the air in the tire.

The tread rubber 18 is disposed on the outer side of the belt 14 in the tire radial direction. Both end portions of the tread rubber 18 are connected to the side rubbers 20 to form the sidewall portions 10S. The rim cushion rubbers 24 are provided at the ends of the side rubbers 20 on the inner side in the tire radial direction and come into contact with the rim on which the tire 10 is mounted. The bead filler rubbers 22 are provided on the outer side of the bead cores 16 in the tire radial direction and interposed between a portion of the carcass ply 12 before the carcass ply 12 is wound around the bead cores 16 and a portion of the carcass ply 12 after the carcass ply 12 is wound around the bead cores 16. The bead filler rubber 22 extends from the bead core 16 to the outer side in the tire radial direction along the carcass ply 12. The innerliner rubber 26 is provided on the inner surface of the tire 10 facing a tire cavity region that is filled with air and is surrounded by the tire 10 and the rim.

In addition, a three-layer belt cover 30 that is formed from organic fiber covered with rubber and that covers the belt 14 from the outer side of the belt 14 in the tire radial direction is provided between the belt member 14b and the tread rubber 18. The belt cover 30 may be provided as needed and is not mandatory. The number of layers that make up the belt cover 30 is not limited to three, and may be one or two layers.

A two-dimensional code 40 is provided on the surface of the sidewall portion 10S of the tire 10 as described above. In FIG. 1, the position of the two-dimensional code 40 is indicated by a thick line.

Sidewall Portion 10S and Two-Dimensional Code 40

Figure 2A:
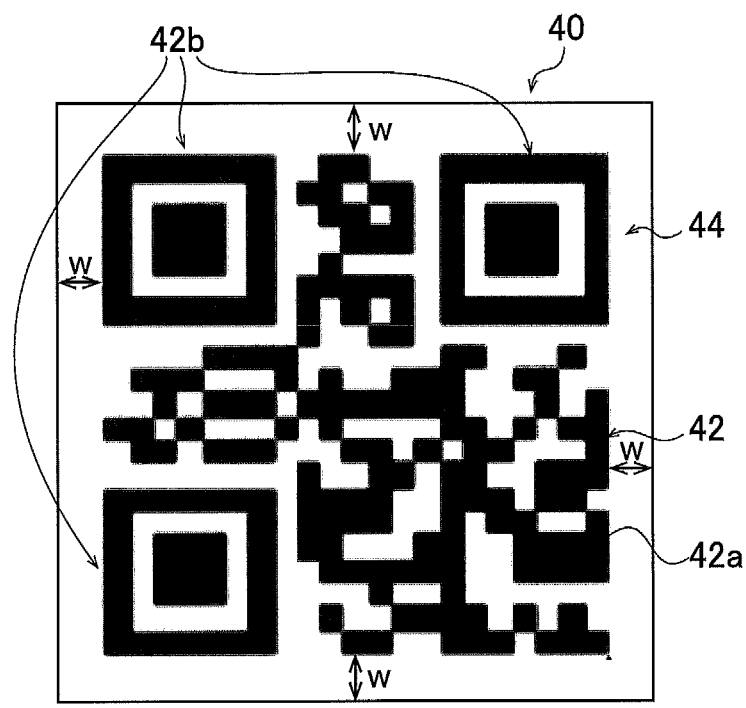
FIGS. 2A and 2B are diagrams illustrating an example of a two-dimensional code according to one embodiment.
Figure 2B:
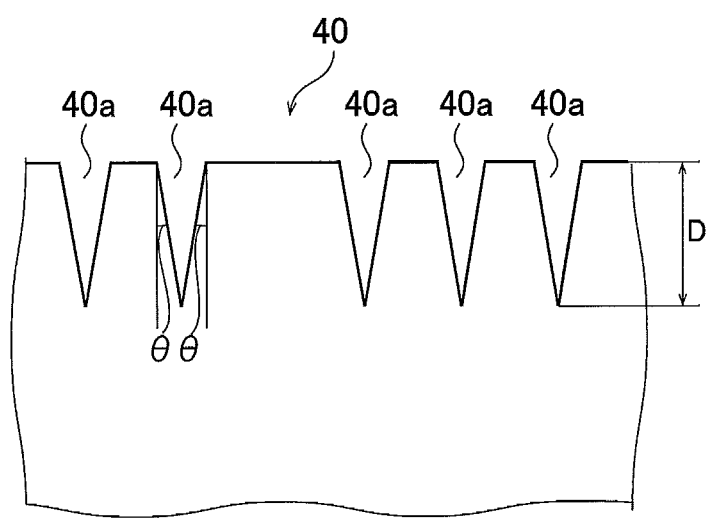

FIG. 2A is a diagram illustrating an example of the two-dimensional code 40 according to one embodiment provided on the surface of the sidewall portion 10S of the tire 10. FIG. 2B is a diagram illustrating an example of surface irregularities of the two-dimensional code 40.

The two-dimensional code 40 is engraved on the surface of the side rubber 20 in either one of the sidewall portions 10S by irradiation with light, for example, a laser beam. The two-dimensional code 40 is formed of a dot pattern made up of two types of gray scale elements distinguishable from each other by surface irregularities. The two-dimensional code 40 is a pattern formed by focusing a laser beam on the surface of the sidewall portion 10S to concentrate light energy, by locally heating and sublimating the side rubber 20, and by engraving the surface by a plurality of fine dot holes 40a. As illustrated in FIG. 2B, the dot holes 40a forming the dot pattern have such a shape that the hole cross-section gradually decreases in the depth direction. In the example illustrated in FIG. 2B, the shape of the hole wall surface is straight, when the dot hole 40a is cut by a plane passing through a hole center axis extending in the depth direction of the dot hole 40a, but the shape of the hole wall surface may be a curve convex or concave toward the hole opening. The dot hole 40a is a hole the opening shape of which is a circular shape including a perfect circular shape and an elliptical shape or a quadrangular shape, and when the opening shape is a perfect circular shape, the diameter thereof is from 0.1 to 1.0 mm, and a hole depth D is from 0.3 to 1.0 mm.

In the two-dimensional code 40, one dot hole (recess portion) is engraved by light in one unit cell region of a dark region among unit cells that define the gray scale elements of the two-dimensional code. No dot holes (recess portions) are provided in a unit cell region of a light region among the unit cells. Specifically, the two-dimensional code 40 has a configuration in which dot holes (recess portions) are engraved so that one dot hole (recess portion) forms one dark unit cell region of the gray scale elements, corresponding to a plurality of rectangular unit cell regions of an identical size divided in a grid-like shape. In FIG. 2A, the dark region of the unit cell region is represented by a region colored in black.

The two-dimensional code 40 illustrated in FIG. 2A is a QR Code® (trade name) and includes a dot pattern region 42 in which a dot pattern including two types of gray scale elements is formed. A blank region 44 including light elements is provided around the dot pattern region 42, the blank region 44 being surrounded by light elements of the gray scale elements. In FIG. 2A, frame lines are illustrated in order to clarify outer edges of the blank region 44. A width w of the blank region 44 is preferably, for example, four to five times the dimension size of one unit cell region in the dot pattern region 42. For example, the blank region 44 is preferably from 15 to 25% the width of the dot pattern region 42.

Because the two-dimensional code 40 illustrated in FIG. 2A is a QR Code® (trade name), the dot pattern region 42 includes: a data cell region 42a in which data cells of the QR Code® (trade name) are displayed; and position detection pattern regions 42b in which position detection patterns are displayed.

In the example illustrated in FIG. 2B, the dot hole 40a forming the dot pattern of the two-dimensional code 40 has a hole cross-section that gradually decreases along the depth direction and forms a sharp square shape at the hole bottom. However, the hole bottom may not be a sharp square shape but may be planar.

When the hole depth D of the dot holes 40a is greater than a predetermined depth range, the distance from the hole bottom to the carcass ply 12 decreases (the thickness of the side rubber 20 at the hole bottom position decreases), the degree of the side rubber 20 absorbing of the deformation of the tire 10 decreases, and cracks are likely to be generated from the hole bottom due to the long-term use of the tire. Further, it is not preferable that the cracks generated from the hole bottom propagates and reaches the carcass ply 12 since it leads to decrease in the durability of the tire 10. In addition, due to the cracks generated in the hole bottom, the surface of the side rubber 20 in which the dot holes 40a are formed is likely to have irregularities, which adversely affects the light elements of the gray scale elements of the two-dimensional code 40 to promote decrease in the readability of the two-dimensional code 40. Moreover, the long-term use of the tire makes it easy for foreign matter such as mud to clog the dot hole 40a, which decreases the readability of the two-dimensional code 40. In this manner, when the hole depth D is greater than the predetermined depth range, the readability of the two-dimensional code 40 due to the long-term use of the tire 10 decreases greatly. On the other hand, if the hole depth D of the dot holes 40a is smaller than the predetermined depth range, the dark elements of the gray scale element of the two-dimensional code 40 become thin, and the readability of the two-dimensional codes 40 when it is brand-new before using the tire 10 decreases.

From this point, the hole depth D of the dot hole 40a is set to a predetermined depth range. However, although the hole depth D of the dot hole 40a can be set to the predetermined depth range, when the dot hole 40a is irradiated with a laser beam without considering the characters of the side rubber 20 such as the degree of easiness of sublimation due to irradiation with laser beam, the hole wall surface of the dot hole 40a may not be stably formed in a predetermined shape, and the decrease in the readability due to the long-term use of the tire 10 may not be sufficiently suppressed.

When forming the dot hole 40a, it is necessary to focus the laser beam at the position where the dot hole 40a is to be formed to increase the energy density and necessary to locally and rapidly heat the side rubber 20 to sublimate the side rubber 20. At this time, the hole depth D of the dot hole 40a depends on the degree of easiness of sublimation of the side rubber 20, the energy density of the laser beam, and the irradiation time of the laser beam. When the side rubber 20 is sublimated using the laser beam, the energy density of the laser beam is adjusted and the irradiation time is determined according to the degree of easiness of sublimation determined by the blending of the raw materials of the side rubber 20. In this way, the hole wall surface of the dot hole 40a can be stably formed in a predetermined shape, and as a result, the decrease in readability due to the long-term use of the tire 10 can be sufficiently suppressed.

A diene rubber including butadiene rubber is used as a rubber raw material of the side rubber 20. In this case, the butadiene rubber is easily sublimated by the irradiation with a laser beam, but carbon (carbon black) contained as a reinforcing member (filler) is not easily sublimated by the irradiation with a laser beam. As a result, the degree of easiness of sublimation of the side rubber 20 is determined by the ratio between the blended amount of the butadiene rubber of the side rubber 20 and the blended amount of carbon. The degree of easiness of sublimation decreases as the ratio of the blended amount of carbon to the blended amount of the butadiene rubber increases, and the degree of easiness of sublimation increases as the ratio of the blended amount of the butadiene rubber to the blended amount of carbon increases.

In the embodiment, when the blended amount of butadiene per 100 parts by mass of the diene rubber in the side rubber 20 is A parts by mass, when the blended amount of carbon contained in the side rubber 20 is B parts by mass, the ratio of the blended amount A of the butadiene to the blended amount B of the carbon is a ratio (A/B), and when the hole depth from the opening of the dot hole 40a of the two-dimensional code 40 to the hole bottom is D (mm), the ratio (A/B) and the hole depth D satisfies the relationship of $1.1 \le (A/B)/D \le 6.0$.

The ratio (A/B) indicates the ratio of the blended amount of the butadiene rubber to the blended amount of the carbon. Therefore, when the blended amount of carbon is large and the ratio (A/B) is small, since the degree of easiness of sublimation of the side rubber 20 is low, the hole depth D tends to decrease under identical irradiation conditions (identical energy density and identical irradiation time) of the laser beam. As described above, since the hole depth D is set to a predetermined depth range, the irradiation conditions (energy density and irradiation time) of the laser beam can be adjusted to adjust the hole depth D. However, when (A/B)/D exceeds the range described above, since the amount of adjustment of the energy density of the laser beam and the irradiation time of the laser beam exceeds an allowable range, it is not possible to stably form the hole wall surfaces of the dot holes 40a in a predetermined shape, and even if the hole wall surfaces of the dot holes 40a can be stably formed, the decrease in the readability due to the long-term use of the tire 10 cannot be suppressed sufficiently.

For example, regardless of a small ratio (A/B), if the depth D is increased such that (A/B)/D deviates from the numerical range, since the irradiation time of the laser beam increases or the energy density increases, a large amount of heat is applied to the side rubber 20, and the degree of deterioration of the hole bottom or the hole wall of the dot hole 40a and the surface of the side rubber 20 around the hole wall increases, which makes it easier to induce the generation of cracks and the development of cracks.

Regardless of a large ratio (A/B), if the hole depth D is decreased such that (A/B)/D deviates from the numerical range, the irradiation time of the laser beam decreases or the energy density decreases. However, in this case, since the side rubber 20 is easy to form the dot hole 40a, the hole depth D of the dot hole 40a and the shape of the hole are likely to vary due to the influence of the variation depending on the location in the blended amount of the butadiene rubber relative to the blended amount of the carbon, which adversely affects the readability of the tire 10.

Therefore, the ratio (A/B)/D is set to be not less than 1.1 and not greater than 6.0. The ratio (A/B)/D is preferably not less than 1.5 and not greater than 5.0. Note that the blended amount A is, for example, in the range of from 50 to 70 parts by mass, and the blended amount B is, for example, in the range of from 30 to 55 parts by mass.

In this way, by setting the ratio (A/B)/D to be not less than 1.1 and not greater than 6.0, it is possible to suppress the degree of deterioration of the surface of the side rubber 20 of the hole wall, and it is possible to sufficiently suppress a decrease in the readability due to the long-term use of the tire 10.

According to one embodiment, the hole wall surface of the dot hole 40a is preferably provided such that the hole cross-section decreases as approaching from the opening of the dot hole 40a to the hole bottom, and a hole wall angle $\theta$ of the dot hole 40a (see FIG. 2B) is preferably from 10 to 50 degrees at a cut section obtained by cutting the dot hole 40a by a plane including the hole center axis in the depth direction of the dot hole 40a. The hole wall angle $\theta$ is the inclination angle of the hole wall with respect to the normal direction orthogonal to the surface of the side rubber 20 in the opening of the dot hole 40a on the surface of the side rubber 20. The groove wall angle $\theta$ is the inclination angle of the straight line connecting the opening to the hole bottom on the cut section. The hole wall with the hole wall angle $\theta$ can be stably formed by adjusting the irradiation conditions of the laser beam while setting the ratio (A/B)/D to be not less than 1.1 and not greater than 6.0. When the hole wall angle $\theta$ is less than 10 degrees, foreign matter such as mud is likely to clog the dot holes 40a, and the readability of the two-dimensional code 40 due to the use of the tire 10 is likely to decrease. On the other hand, when the hole wall angle $\theta$ is greater than 50 degrees, since light entering the dot hole 40a is likely to leak out of the dot hole 40a due to reflection, the difference between the dark element and the light element of the gray scale element decreases, and the readability of the two-dimensional code 40 is likely to decrease. Thus, the readability of the two-dimensional code 40 during long-term use of the tire 10 is further likely to decrease.

When the laser is irradiated under identical irradiation conditions, and the blended amount of the butadiene rubber is relatively large and the ratio (A/B) is high, the degree of easiness of sublimation of the side rubber 20 increases and the hole wall angle $\theta$ tends to decrease. On the other hand, when the ratio (A/B) is small and the blended amount of carbon is relatively large, the degree of easiness of sublimation of the side rubber 20 decreases and the hole wall angle $\theta$ tends to increase.

According to one embodiment, when the area of the hole cross-section at a position separated by 70% of the hole depth D in the depth direction from the opening of the dot hole 40a is $S_{70}$ and when the area of the hole cross-section at the opening is $S_0$, the ratio $S_{70}/S_0$ is preferably from 0.2 to 0.5. When the ratio $S_{70}/S_0$ deviates from the range described above, mud and the like are likely to clog the dot holes 40a, and the readability of the two-dimensional code 40 due to use is likely to decrease. Moreover, the light entering the dot hole 40a is likely to leak out of the dot hole 40a due to reflection, and the difference in gray scale between the dark element and the light element in the gray scale element decreases, and the readability of the two-dimensional code 40 is likely to decrease.

The numerical range of the ratio $S_{70}/S_0$ can be achieved by adjusting the irradiation conditions of the laser beam while setting the ratio (A/B)/D to be not less than 1.1 and not greater than 6.0.

Figure 3A:
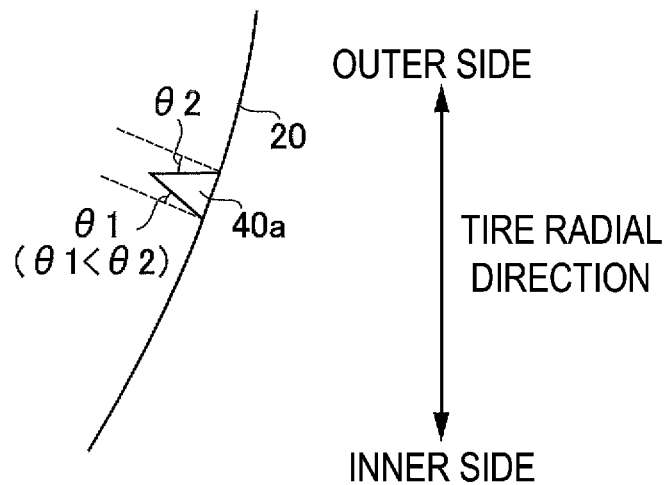
FIGS. 3A and 3B are diagrams illustrating the shapes of dot hole obtained by cutting the dot hole by cutting planes along a tire radial direction and a tire circumferential direction, respectively.

In accordance with an embodiment, the thickness of the side rubber 20 on a first side in the tire radial direction is greater than the thickness of a second side, the second side being the side opposite the first side, in the range in which the two-dimensional code 40 is provided, and when the cut section obtained by cutting the dot hole 40a by a plane including the hole center axis in the depth direction of the dot hole 40a is the cut section along the tire radial direction, of the hole wall angles $\theta$ at the cut section, a hole wall angle $\theta1$ on the first side in the tire radial direction is preferably smaller than a hole wall angle $\theta2$ on the second side in the tire radial direction. FIG. 3A is a diagram illustrating the shape of the dot hole 40a obtained by cutting the dot hole 40a by the cutting plane along the tire radial direction when the first side is on the inner side in the tire radial direction and the second side is on the outer side in the tire radial direction.

As illustrated in FIG. 3A, the hole wall angle $\theta1$ is smaller than the hole wall angle $\theta2$. By providing the dot hole 40a having such a shape, the hole bottom position of the dot hole 40a shifts to the first side (the inner side) in the tire radial direction. Since the thickness of the side rubber 20 on the first side (the inner side) in the tire radial direction is greater than the thickness of the side rubber 20 on the second side (the outer side), cracks are not easily formed at the hole bottom position and the development of cracks can be suppressed.

Figure 3B:
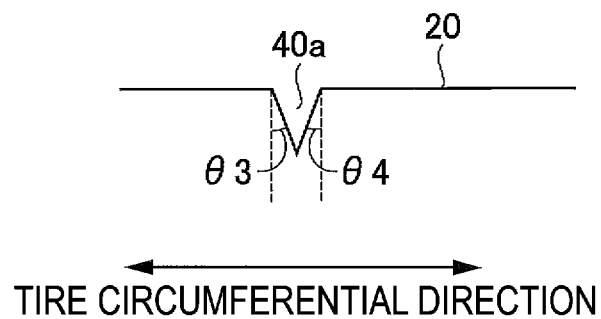

According to one embodiment, when the cut section obtained by cutting the dot hole 40a by a plane that includes the hole center axis in the depth direction of the dot hole 40a is a cut section along the tire circumferential direction, of the hole wall angles $\theta$ at the cut section, it is preferable that the absolute value of the difference ($\theta3-\theta4$) between a hole wall angle $\theta3$ on one side in the tire circumferential direction (see FIG. 3B) and a hole wall angle $\theta4$ on the other side (see FIG. 3B) is smaller than the absolute value of the angular difference ($\theta1-\theta2$) between the hole wall angle $\theta1$ and the hole wall angle $\theta2$. FIG. 3B is a diagram illustrating the shape of the dot hole 40a obtained by cutting the dot hole 40a by the cutting plane along the tire circumferential direction.

In the tire circumferential direction, since the thickness of the side rubber 20 is substantially uniform in the tire circumferential direction, the absolute value of the difference ($\theta3-\theta4$) is preferably smaller than the absolute value of the angular difference ($\theta1-\theta2$).

According to one embodiment, the 300% tensile modulus of the side rubber 20 is preferably from 5.0 to 10.0 MPa. Since the ratio (A/B)/D of the side rubber 20 having the tensile modulus can be set to the numerical range described above, when this side rubber 20 is used, the hole depth D (mm) of the dot hole 40a can be set such that the two-dimensional code 40 can be read, the degree of deterioration of the surface of the side rubber 20 of the hole wall of the dot hole 40a can be suppressed, and a decrease in the readability due to the long-term use of the tire 10 can be sufficiently suppressed. The 300% tensile modulus is measured at room temperature (for example, 20° C.) at a tensile speed of 500 mm/minute in accordance with JIS (Japanese Industrial Standard) K6251.

According to one embodiment, the nitrogen specific surface area of the carbon contained in the side rubber 20 is preferably from 30 to 90 (m²/g). By using the carbon having a nitrogen specific surface area of from 30 to 90 (m²/g), the degree of deterioration of the hole wall surface of the dot hole 40a can be further suppressed, and a decrease in the readability due to the long-term use of the tire 10 can be sufficiently suppressed. The nitrogen specific surface area of the carbon is measured in accordance with JIS K 6217-2.

The side rubber 20 preferably contains N-(1,3-dimethylbutyl)-N'phenyl-p-phenylenediamine or poly-(2,2,4-trimethyl-1,2 dihydroquinoline) as an anti-aging agent.

Example, Comparative Example

To confirm the effects of the embodiments described above, various tires 10 (tire size: 195/65R15 91H) having different shapes of dot holes for the two-dimensional code 40 (specifically, a QR Code® (trade name)) are manufactured, and the readability of the two-dimensional code 40 during long-term use of the tire 10 is tested. The tire configuration of each tire 10 is as illustrated in FIG. 1.

The dot hole 40a of the two-dimensional code 40 is a circular hole, and the inner diameter of the hole is 0.5 mm. The QR Code® (trade name) had a size of 15 mm×15 mm.

To simulate long-term use of the tire 10, drum testing was conducted on each tire 10 on an indoor drum under predetermined conditions simulating long-term use. The drum testing is low-pressure testing based on FMVSS139 (rim size: 15×6J, XL: 160 kPa, and load: 100% LI). For the predetermined conditions simulating long-term use, specifically, the vehicle was driven 10000 km at a speed of 81 km/h, with the tire 10 irradiated with ozone at an ozone concentration of 100 pphm. After driving, whether the two-dimensional code 40 could be read was checked using a mobile terminal with varied methods of applying illumination light.

Ten tires 10 after driving are prepared for each Example and Comparative Example, and the two-dimensional code 40 is read with varied methods of applying illumination light. A reading rate was defined as the ratio of the number of correct readings to the number of readings of the two-dimensional code 40. The reading rate in Examples is expressed as an index value with the reading rate in Comparative Example assigned as a reference (the reading rate in Comparative Example being assigned as an index of 100). Larger index values indicate a higher reading rate. The index is used as the evaluation result of the readability of the two-dimensional codes when the tire is used for a long period of time.

Table 1 below indicates results of the reading rate (readability) of the two-dimensional code 40 with respect to the arrangement position of the two-dimensional code 40. The blending of the raw materials of the side rubber 20 is changed, and the irradiation time of the laser beam is adjusted so that the groove depth D is set to be in a range of from 0.5 to 0.7 mm.

"Groove wall angle θ (degrees)" is the average of the hole wall angles at 8 points on the circumference around the dot hole.

"Groove wall angles θ1 and θ2" are the angles illustrated in FIG. 3A, and in the range where the two-dimensional codes 40 are provided, the thickness of the side rubber 20 on the inner side in the tire radial direction is greater than that on the outer side. In Examples 7 and 8, the hole wall angles θ1, θ2 are set to 20 degrees or 40 degrees, and the other hole wall angles are set to 30 degrees.

TABLE 1

|  | Comparative Example 1 | Comparative Example 2 | Example 1 | Example 2 | Example 3 |
|---|---|---|---|---|---|
| (A/B)/D | 0.9 | 6.5 | 1.1 | 3.0 | 6.0 |
| Hole wall angle θ (degrees) | 30 | 30 | 30 | 30 | 30 |
| Hole wall angle θ1, θ2 | θ1 = θ2 | θ1 = θ2 | θ1 = θ2 | θ1 = θ2 | θ1 = θ2 |
| Readability after long-term use | 100 | 101 | 106 | 108 | 104 |

TABLE 2

|  | Example 4 | Example 5 | Example 6 | Example 7 | Example 8 | Example 9 | Example 10 |
|---|---|---|---|---|---|---|---|
| (A/B)/D | 2.3 | 2.3 | 2.3 | 2.3 | 2.3 | 2.3 | 2.3 |
| Hole wall angle θ (°) | 5 | 10 | 30 | 50 | 55 | 20 to 40 | 20 to 40 |
| Hole wall angle θ1, θ2 | θ1 = θ2 | θ1 = θ2 | θ1 = θ2 | θ1 = θ2 | θ1 = θ2 | θ1 < θ2 | θ1 > θ2 |
| Readability after long-term use | 104 | 106 | 107 | 105 | 103 | 109 | 106 |

From comparison between Comparative Examples 1 and 2 and Examples 1 to 3, it can be understood that by setting the ratio (A/B)/D to be not less than 1.1 and not greater than 6.0, the readability of the two-dimensional code during long-term use of the tire is improved as compared to Comparative Examples 1 and 2.

From comparison between Examples 4 to 8, it can be understood that by setting the hole wall angle to from 10 to 50 degrees, the readability of the two-dimensional codes during long-term use of the tire is improved.

Additionally, it is understood that when the thickness of the side rubber 20 on the inner side in the tire radial direction is greater than that on the outer side in the range where the two-dimensional codes 40 are provided, the readability of the two-dimensional codes during long-term use of the tire is improved by setting the hole wall angle $\theta 1$ on the inner side in the tire radial direction to be smaller than the hole wall angle $\theta 2$ on the outer side in the tire radial direction.

The foregoing has been a detailed description of the pneumatic tire according to embodiments of the present technology. However, the present technology is naturally not limited to the above embodiments and Examples, and may be improved or modified in various ways within the scope of the present technology.

The invention claimed is:

1. A pneumatic tire, comprising:
   a side rubber provided on each of sidewall portions of the pneumatic tire and covering a carcass ply of the pneumatic tire from an outer side of the tire; and
   a two-dimensional code provided on a surface of the side rubber, the two-dimensional code having a configuration in which a dot pattern is formed by two types of gray scale elements including a light element and a dark element distinguishable from each other by irregularities on the surface and in which dot holes are engraved using light, corresponding to the dark element of the gray scale elements,
   the side rubber being a diene rubber comprising butadiene rubber, and
   when A is a blended amount of the butadiene rubber relative to 100 parts by mass of the diene rubber contained in the side rubber and when B is a blended amount of carbon, a ratio A/B of the blended amount A to the blended amount B and a hole depth D (mm) from an opening of the dot holes to a hole bottom of the dot holes satisfying a relationship of $1.1 \leq (A/B)/D \leq 6.0$, wherein
   a 300% tensile modulus of the side rubber is from 5.0 to 9.0 MPa,
   the blended amount A is in a range of from greater than 53 parts by mass to less than 68 parts by mass,
   a hole wall surface of each dot hole is provided such that a hole cross-section decreases as approaching from the opening to the hole bottom,
   a hole wall angle at a cut section of each dot hole obtained by cutting the dot hole by a plane comprising a hole center axis in a depth direction of the dot hole is from 10 to 50 degrees, with respect to the depth direction of the dot hole,
   a thickness of the side rubber on a first side in a tire radial direction is greater than that on a second side, the second side being a side opposite to the first side, in a range in which the two-dimensional code is provided, and
   the cut section is a cut section along the tire radial direction, and of the hole wall angles of the dot hole at the cut section, a hole wall angle $\theta 1$ on the first side in the tire radial direction is smaller than a hole wall angle $\theta 2$ on the second side in the tire radial direction.

2. The pneumatic tire according to claim 1, wherein when S70 is an area of a hole cross-section of the dot at a position separated by 70% of the hole depth D from the opening in the depth direction of the dot and when S0 is an area of the hole cross-section at the opening, a ratio S70/S0 is from 0.2 to 0.5.

3. The pneumatic tire according to claim 1, wherein in a cut section of the dot holes along a tire circumferential direction, an absolute value of a difference between a hole wall angle $\theta 3$ on one side in the tire circumferential direction and a hole wall angle $\theta 4$ on an other side is smaller than an absolute value of an angular difference between the hole wall angle $\theta 1$ and the hole wall angle $\theta 2$.

4. The pneumatic tire according to claim 1, wherein a nitrogen specific surface area of the carbon is from 30 to 90 m2/g.

5. The pneumatic tire according to claim 1, wherein the blended amount B is in a range of from greater than 45 parts by mass to 55 parts by mass.

6. The pneumatic tire according to claim 1, wherein the blended amount B is in a range of from greater than 47 parts by mass to 55 parts by mass.

7. A pneumatic tire, comprising:
   a side rubber provided on each of sidewall portions of the pneumatic tire and covering a carcass ply of the pneumatic tire from an outer side of the tire; and
   a two-dimensional code provided on a surface of the side rubber, the two-dimensional code having a configuration in which a dot pattern is formed by two types of gray scale elements including a light element and a dark element distinguishable from each other by irregularities on the surface and in which dot holes are engraved using light, corresponding to the dark element of the gray scale elements,
   the side rubber being a diene rubber comprising butadiene rubber, and
   when A is a blended amount of the butadiene rubber relative to 100 parts by mass of the diene rubber contained in the side rubber and when B is a blended amount of carbon, a ratio A/B of the blended amount A to the blended amount B and a hole depth D (mm) from an opening of the dot to a hole bottom of the dot satisfying a relationship of $1.1 \leq (A/B)/D \leq 6.0$, wherein
   a 300% tensile modulus of the side rubber is from 5.0 to 9.0 MPa, and
   the blended amount B is in a range of from greater than 47 parts by mass to 55 parts by mass
   a hole wall surface of each dot hole is provided such that a hole cross-section decreases as approaching from the opening to the hole bottom,
   a hole wall angle at a cut section of each dot hole obtained by cutting the dot hole by a plane comprising a hole center axis in a depth direction of the dot hole is from 10 to 50 degrees, with respect to the depth direction of the dot hole,
   a thickness of the side rubber on a first side in a tire radial direction is greater than that on a second side, the second side being a side opposite to the first side, in a range in which the two-dimensional code is provided, and the cut section is a cut section along the tire radial direction, and of the hole wall angles of the dot hole at the cut section, a hole wall angle θ1 on the first side in the tire radial direction is smaller than a bole wall angle θ2 on the second side in the tire radial direction.

\* \* \* \* \*